(12) United States Patent
Hong

(10) Patent No.: US 7,129,617 B2
(45) Date of Patent: Oct. 31, 2006

(54) ROTARY-TYPE COMB-DRIVE ACTUATOR AND VARIABLE OPTICAL ATTENUATOR USING THE SAME

(75) Inventor: Yoon Shik Hong, Kyungki-do (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 252 days.

(21) Appl. No.: 10/921,194

(22) Filed: Aug. 19, 2004

(65) Prior Publication Data
US 2005/0264131 A1 Dec. 1, 2005

(30) Foreign Application Priority Data
May 28, 2004 (KR) .................. 10-2004-0038049

(51) Int. Cl.
*H02N 1/00* (2006.01)
*G02B 26/08* (2006.01)
(52) U.S. Cl. ............... 310/309; 359/223; 359/198; 385/16; 385/140
(58) Field of Classification Search .......... 310/309; 385/16, 18, 47, 140; 359/223, 198; 200/181
See application file for complete search history.

(56) References Cited

U.S. PATENT DOCUMENTS

| | | | | |
|---|---|---|---|---|
| 5,025,346 | A | 6/1991 | Tang et al. | 361/283 |
| 5,400,824 | A * | 3/1995 | Gschwendtner et al. | 137/625.28 |
| 5,969,848 | A | 10/1999 | Lee et al. | 359/298 |
| 6,078,016 | A * | 6/2000 | Yoshikawa et al. | 200/181 |
| 6,384,510 | B1* | 5/2002 | Grade et al. | 310/309 |
| 6,404,969 | B1* | 6/2002 | Tayebati et al. | 385/140 |
| 6,577,785 | B1* | 6/2003 | Spahn et al. | 385/22 |
| 6,612,029 | B1 | 9/2003 | Behin et al. | 29/847 |
| 6,701,039 | B1* | 3/2004 | Bourgeois et al. | 385/22 |
| 6,801,683 | B1* | 10/2004 | Kanie et al. | 385/18 |
| 6,901,204 | B1* | 5/2005 | Hong et al. | 385/140 |
| 2003/0103715 | A1* | 6/2003 | Kanie et al. | 385/16 |
| 2005/0264131 | A1* | 12/2005 | Hong | 310/309 |

FOREIGN PATENT DOCUMENTS

JP 4-325882 * 11/1992

* cited by examiner

*Primary Examiner*—Karl Tamai
(74) *Attorney, Agent, or Firm*—Lowe Hauptman & Berner, LLP

(57) ABSTRACT

The present invention relates to an actuator and optical attenuator using the actuator. The rotary-type comb-drive actuator includes a substrate, a movable electrode, a drive electrode, one or more vertical springs, one or more vertical spring anchors, a horizontal spring and a horizontal spring anchor. The movable electrode is arranged on a plane of the substrate to be movable in parallel to the substrate plane, and formed to have a predetermined length so as to have a comb-shaped electrode comprised of a plurality of fingers. The drive electrode is formed to have a length corresponding to that of the movable electrode, and formed to have a comb-shaped electrode that is comprised of a plurality of fingers and arranged to be interdigitated with the comb-shaped electrode of the movable electrode. The vertical springs are arranged in parallel to the substrate, and connected to be perpendicular to the movable electrode on both sides of a first end of the movable electrode. The vertical spring anchors are connected to the vertical springs to support the vertical springs. The horizontal spring has a main part connected in parallel to a longitudinal direction of the movable electrode. The horizontal spring anchor is connected to the horizontal spring to support the horizontal spring, and fixed on the substrate.

9 Claims, 10 Drawing Sheets

ROTARY-TYPE COMB-DRIVE ACTUATOR AND VARIABLE OPTICAL ATTENUATOR USING THE SAME

RELATED APPLICATIONS

The present application is based on, and claims priority from, Korean Application Serial Number 2004-38049, filed May 28, 2004, the disclosure of which is hereby incorporated by reference herein in its entirety.

BACKGROUND OF THE INVENTION

1. Field of the Invention

The present invention relates, in general, to an actuator provided by micro electro mechanical systems technology and optical actuator using the actuator and, more particularly, to an actuator and optical attenuator using the actuator, which utilizes an attractive force applied between comb-shaped electrodes.

2. Description of the Related Art

Generally, a comb-drive actuator refers to an actuator in which electrodes each having a plurality of fingers are interdigitated with each other and the positions of the electrodes can be changed using a voltage applied to the two electrodes.

Especially, a comb-drive actuator utilizing Micro Electro Mechanical Systems (MEMS) technology is excellent in the generation efficiency of an electrostatic force per unit area, the linearity of a drive displacement, etc. The comb-drive actuator has been frequently used in a gyro, an accelerometer, a mechanical filter, a variable optical attenuator, an optical switch, etc., since W. C. Tang, et al. developed a resonant microstructure (disclosed in U.S. Pat. No. 5,052,346) that is driven in parallel to the plane of a substrate. Further, A. P. Lee, et al. invented a comb-drive electrostatic actuator (disclosed in U.S. Pat. No. 5,969,848) that moves vertically to a substrate, and then proposed the alternative application of an actuator for corner cube reflectors. Further, B. Bhin, et al. invented an actuator (disclosed in U.S. Pat. No. 6,612,029) creating an out-of-plane rotatable flexure using comb-shaped electrodes.

When a micro shutter is inserted into an interval between two optical fibers aligned on a substrate using a comb-drive actuator driven in parallel to the plane of a surface, the quantity of light transmitted between the optical fibers can be controlled. Through the application of this principle, a variable optical attenuator or optical switch can be developed using the comb-drive actuator.

However, such a comb-drive scheme requires little current, but requires a high voltage to enhance a driving force. That is, in order to generate a constant displacement, a high voltage is required, so that a voltage amplification circuit must be separately constructed to control the high voltage using typical digital signals with a voltage of 5V or lower, thus increasing the sizes of elements and costs of products.

Alternatively, for a method of decreasing a drive voltage while maintaining the driving distance of a typical comb-drive actuator, there is a method of simply increasing the number of comb-shaped electrodes or decreasing the stiffness of the actuator.

FIGS. 1a to 1c are views showing a conventional comb-drive actuator and alternative actuators.

FIG. 1a illustrates a comb-drive actuator disclosed in U.S. Pat. No. 5,025,346 and proposed by W. C. Tang, et al., which includes a stationary comb electrode 1 fixed on a substrate (not shown) and a movable comb electrode 2 interdigitated with the stationary comb electrode 1. The movable comb electrode 2 is vertically connected to a horizontal axis 3. Both ends of the horizontal axis 3 are connected to vertical springs 4 and 5, respectively. In this case, the stationary comb electrode 1 and the vertical springs 4 and 5 are fixed on the substrate by anchors 6, 7 and 8, respectively. In such a structure, the conventional comb-drive actuator is characterized in that it moves in parallel to the substrate and performs translational motion.

As shown in FIG. 1a, it is assumed that, when a voltage $V_0$ is applied to the comb-drive actuator having a spring constant k, a stationary displacement $\delta$ is generated. If a voltage required to generate the stationary displacement $\delta$ can be further decreased, a voltage amplification circuit can be removed and the size of the products using the actuator can be reduced, thus obtaining a plurality of advantages.

As described above, in the conventional comb-drive actuator, because a driving force is proportional to the square of a drive voltage, the driving force must be increased four times, or stiffness must be decreased by three quarters so as to decrease the drive voltage by half. Such alternative designs are shown in FIGS. 1b and 1c.

FIG. 1b illustrates a design in which the stiffness is decreased by three quarters (0.25k) in the conventional comb-drive actuator. Further, FIG. 1c illustrates a design in which the number of comb-shaped electrodes is increased four times in the conventional comb-drive actuator, so that the driving force is increased four times.

In this case, if it is assumed that the resonant frequency of the structure of FIG. 1a is $\omega$, the resonant frequency is decreased in such a way that the resonant frequency of that of FIG. 1b is $0.5\omega$), and the resonant frequency of that of FIG. 1c has a value close to $0.5\omega$. That is, it can be seen that the structures of FIGS. 1b and 1c are weak in external vibrations compared to the conventional structure of FIG. 1a.

For example, it is assumed that there is a comb-drive actuator basically movable by 25 μm at a drive voltage of 20V. The resonant frequency of such an actuator can be designed to be approximately 1 KHz. If a comb-drive actuator that can be driven by a driving distance of about 25 μm at a drive voltage of 5V or lower is required to be developed by changing the number of comb-shaped electrodes and the stiffness, the mass of the actuator is increased and the stiffness is decreased in proportion to the increased number of comb-shaped electrodes, so that the resonant frequency of the structure is decreased to 200 Hz or lower.

Actually, when a comb-drive actuator is manufactured using the conventional structure and experiments are carried out with respect to the actuator, an applied voltage is about 20V if a driving distance is 25 μm, and a resonant frequency at this time is 900 Hz. If this drive voltage can be decreased to 5V or lower to be driven as a digital signal and the driving distance can be maintained at 25 μm, a drive voltage amplification circuit can be removed in the applications, such as the above-described variable optical attenuator, and the size of products using the actuator is decreased, thus strengthening the competitiveness of the products. However, when the comb-drive actuator is designed and manufactured using the conventional structure, the design of products using the actuator is limited in that, since experimental results show that a resonant frequency is lower than 250 Hz (the number of comb-shaped electrodes is increased eight times and stiffness is decreased by half), response variations are generated depending on external vibrations and a response drift occurs due to the weight of the structure itself.

Moreover, if the above-described conventional comb-drive actuator is used for an optical attenuator that controls the power of an optical signal in an optical network, a method of increasing a driving distance relative to a voltage by simply increasing the number of the comb-shaped electrodes or by decreasing the stiffness of springs, is problematic in that the resonant frequency of the structure is decreased and varied sensitively to external vibrations. That is, the optical attenuator must attenuate incident light to a certain level, but there occur several problems including a problem that the attenuator cannot satisfy the fundamental functions thereof when external vibrations are applied to the optical attenuator.

SUMMARY OF THE INVENTION

Accordingly, the present invention has been made keeping in mind the above problems occurring in the prior art, and an object of the present invention is to provide an actuator, which can obtain a required driving distance using a low drive voltage without requiring an additional circuit.

Another object of the present invention is to provide an actuator, which can obtain a required driving distance while being easily implemented as a small-sized device.

A further object of the present invention is to provide a variable optical attenuator, which can control the quantity of incident light to be a certain level using a low voltage while being easily manufactured as a small-sized device.

In order to accomplish the above objects, the present invention provides a rotary-type comb-drive actuator, comprising a substrate; a movable electrode arranged on a plane of the substrate to be movable in parallel to the substrate plane, and formed to have a predetermined length so as to have a comb-shaped electrode comprised of a plurality of fingers; a drive electrode formed to have a length corresponding to that of the movable electrode so as to apply an electrostatic force to the movable electrode, and formed to have a comb-shaped electrode that is comprised of a plurality of fingers and arranged to be interdigitated with the comb-shaped electrode of the movable electrode, the drive electrode being fixed on the substrate; one or more vertical springs arranged in parallel to the substrate, and connected to be perpendicular to the movable electrode on both sides of a first end of the movable electrode; one or more vertical spring anchors connected to the vertical springs to support the vertical springs, and fixed on the substrate; a horizontal spring having a main part connected in parallel to a longitudinal direction of the movable electrode, the horizontal spring being connected to a side of the movable electrode; and a horizontal spring anchor connected to the horizontal spring to support the horizontal spring, and fixed on the substrate.

Preferably, the comb-shaped electrodes formed on the movable and drive electrodes may be designed to have the fingers concentrically extended around a rotation center on the movable electrode so that the electrodes do not interfere with each other during rotation of the movable electrode.

Preferably, the vertical springs may be arranged to be symmetrical around a rotation center on the movable electrode.

Preferably, the horizontal spring may have a first end bent perpendicularly and connected to a side of the movable electrode, and a second end bent perpendicularly and connected to the horizontal spring anchor.

Preferably, the substrate may be made of silicon.

Preferably, the rotary-type comb-drive actuator may further comprise an auxiliary horizontal spring extending along a longitudinal direction of the movable electrode from an end of the movable electrode adjacent to a rotation center on the movable electrode; and an auxiliary horizontal spring anchor connected to the auxiliary horizontal spring to support the auxiliary horizontal spring, and fixed on the substrate.

Preferably, the horizontal spring may be formed in a meander line structure in which the horizontal spring is bent several times.

Preferably, the rotary-type comb-drive actuator may further comprise a counter mass with a predetermined weight connected to an end of the movable electrode adjacent to a rotation center on the movable electrode so that an excitation force of a vibration noise acts on the rotation center when the vibration noise occurs in the actuator in a direction of translational motion.

Further, the present invention provides a variable optical attenuator, comprising the rotary-type comb-drive actuator; a transmission optical fiber arranged on the substrate and adapted to receive incident light; a reception optical fiber arranged to be collinear with the transmission optical fiber and adapted to output light; and a micro shutter having a first end connected to an end of the movable electrode remote from a rotation center on the movable electrode, and a second end formed in a structure to intercept the light, thus controlling light to be output to the reception optical fiber.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
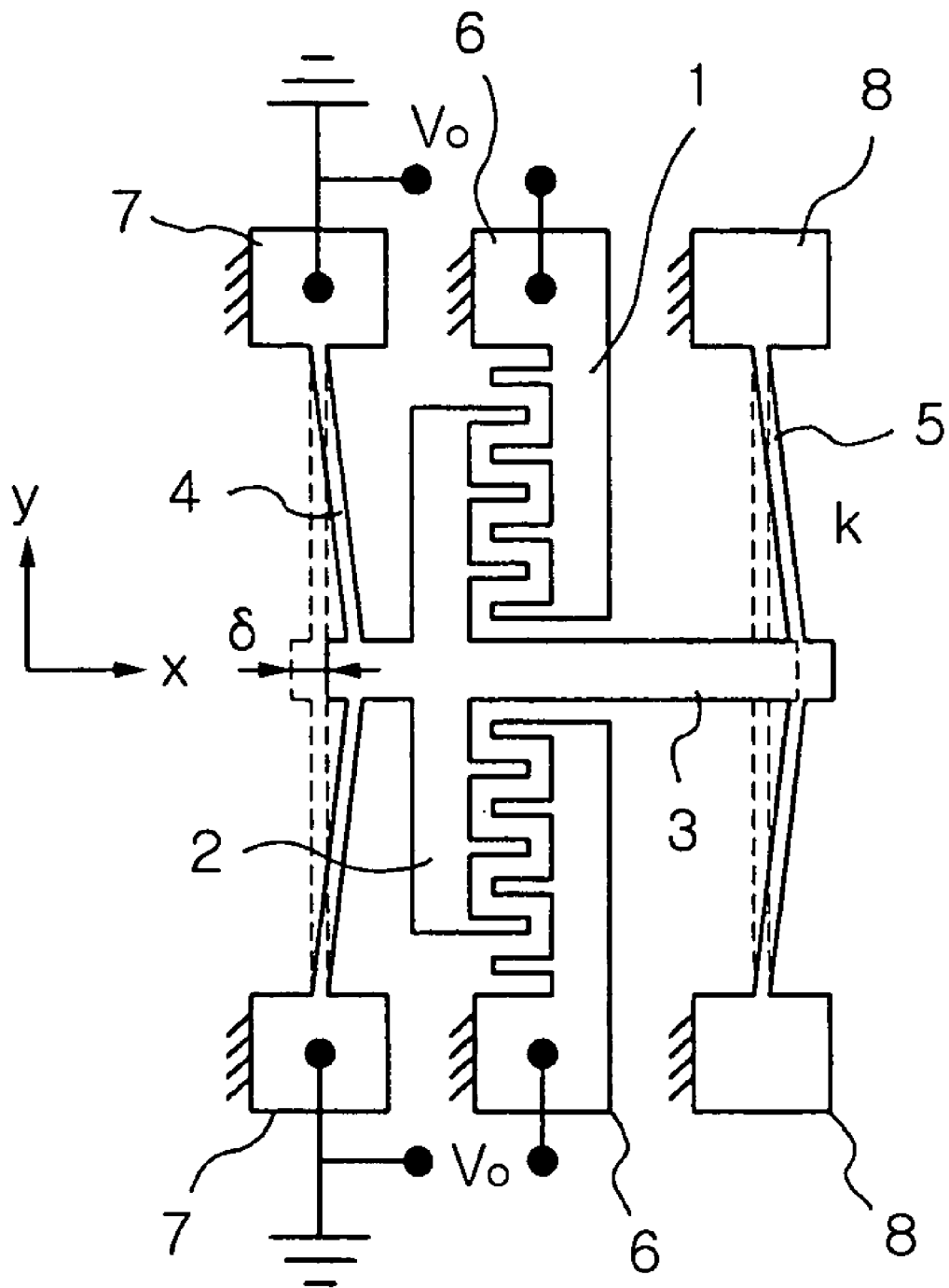
FIGS. 1a to 1c are views showing a conventional comb-drive actuator and alternative actuators.
Figure 1B:
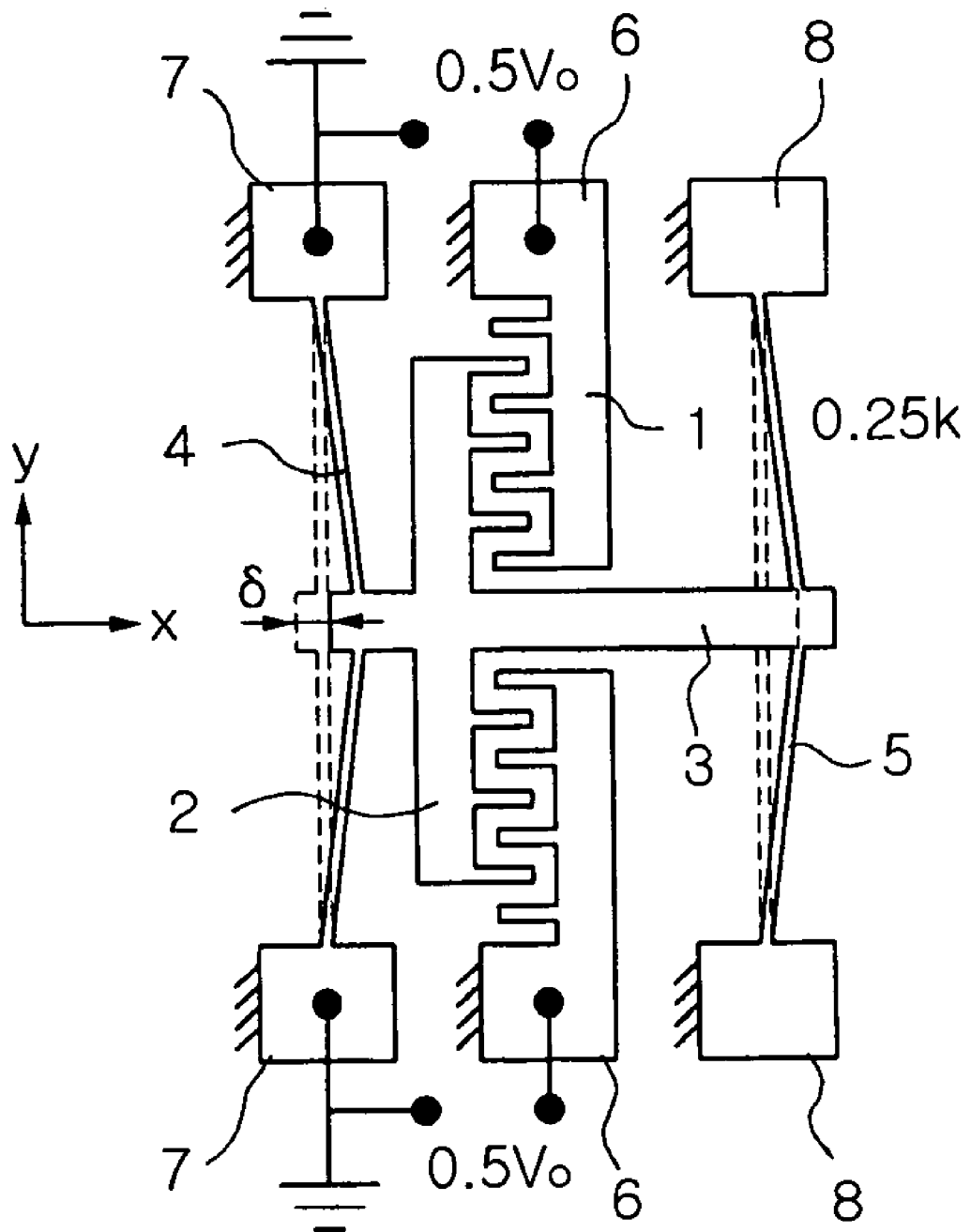
Figure 1C:
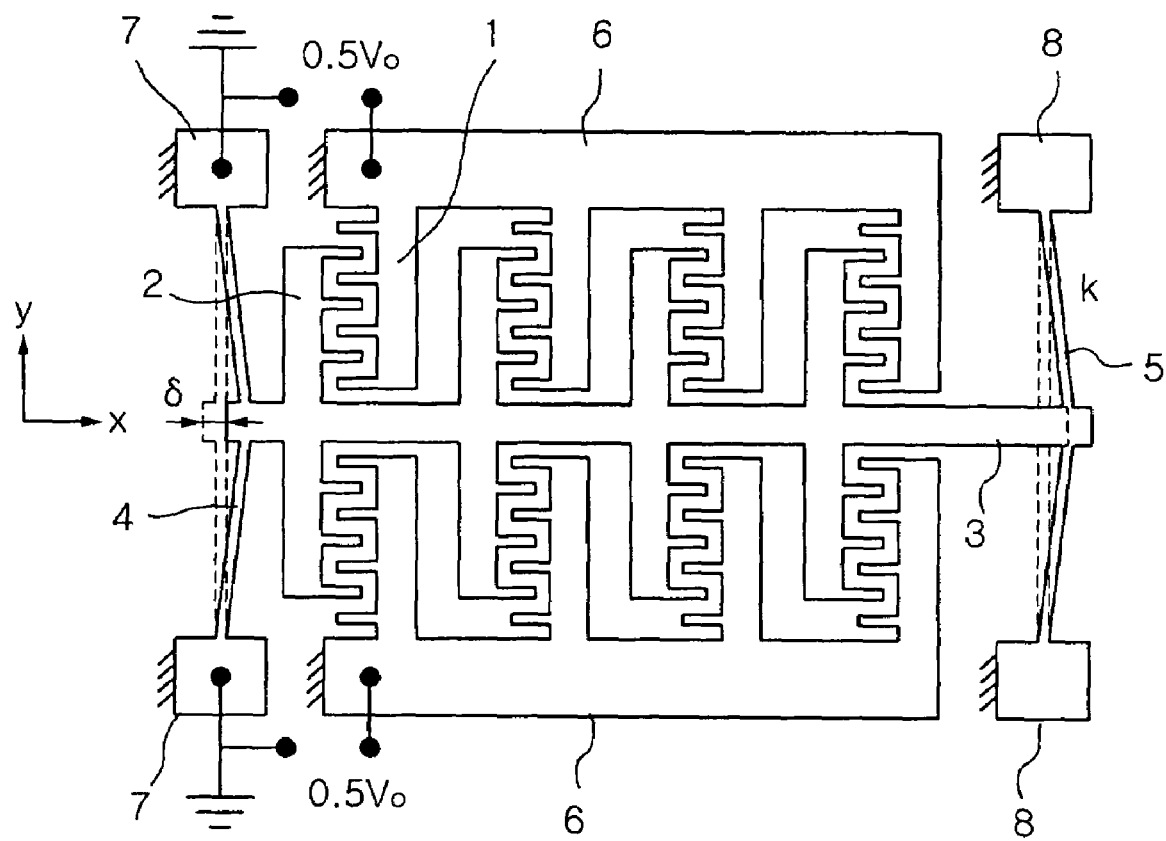

Hereinafter, embodiments of the present invention will be described in detail with reference to the attached drawings. Reference now should be made to the drawings, in which the same reference numerals are used throughout the different drawings to designate the same or similar components. In the present specification, if it is determined that a detailed description of related art or construction unnecessarily makes the gist of the present invention unclear, the detailed description thereof will be omitted.

Figure 2:
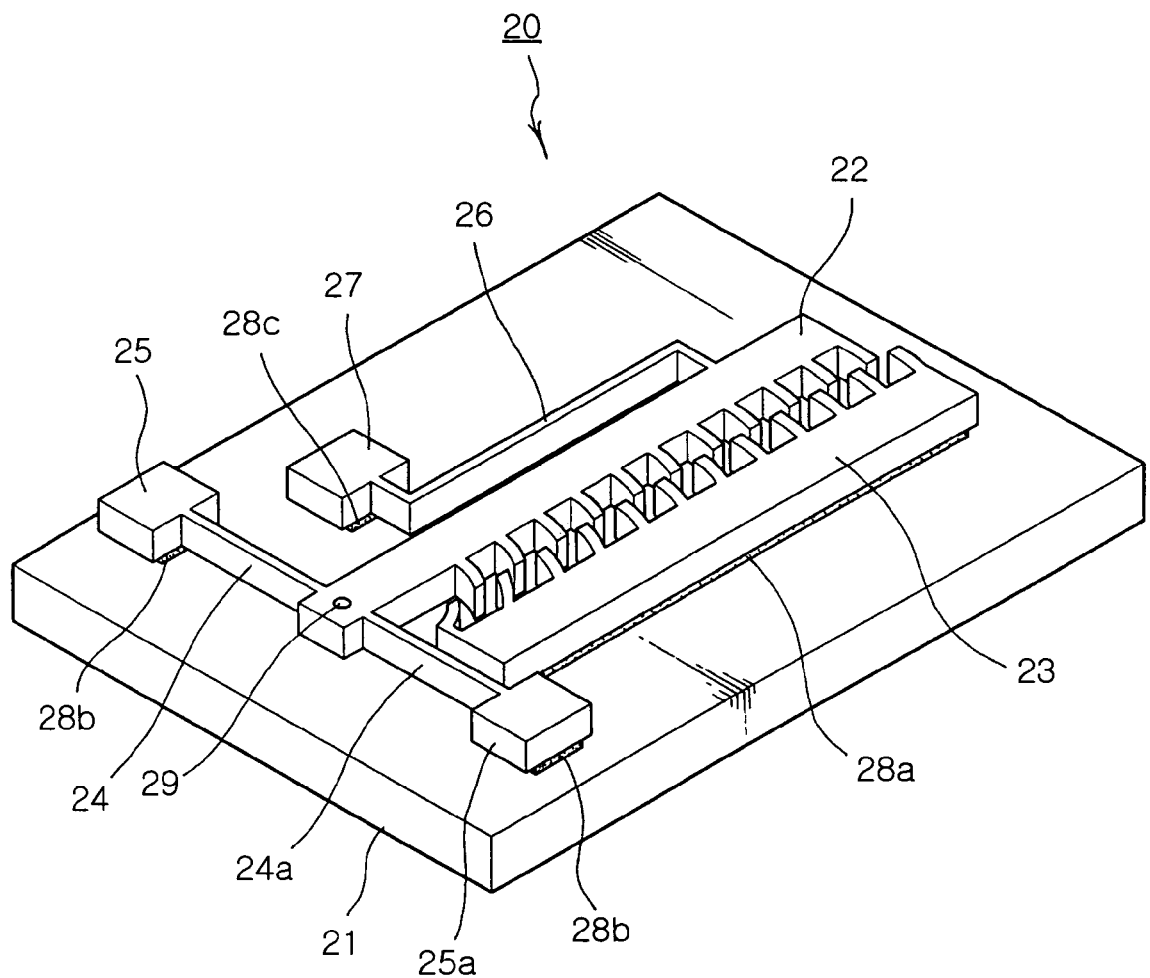
FIG. 2 is a perspective view of a rotary-type comb-drive actuator according to a first embodiment of the present invention.

FIG. 2 is a perspective view of a rotary-type comb-drive actuator according to a first embodiment of the present invention.

Referring to FIG. 2, a rotary-type comb-drive actuator 20 according to the first embodiment of the present invention includes a silicon substrate 21, a comb-shaped movable electrode 22, a comb-shaped drive electrode 23, vertical and horizontal springs 24, 24a and 26, and anchors 25, 25a and 27 to support the springs 24, 24a and 26, respectively.

The movable electrode 22 is arranged on the silicon substrate 21 to be movable in parallel to the plane of the substrate 21 while being spaced apart from the substrate 21 by a predetermined distance. Further, the movable electrode 22 is formed lengthwise in a horizontal direction, and has the comb-shaped electrode that is formed thereon and comprised of a plurality of fingers to be driven by an electrostatic force.

The drive electrode 23 has the comb-shaped electrode that is formed thereon and comprised of a plurality of fingers to apply an electrostatic force to the movable electrode 22. The drive electrode 23 is fixed on the substrate 21 by a silicon oxide film 28a. The drive electrode 23 is formed in a horizontal direction to have a length corresponding to that of the movable electrode 22. In this case, the comb-shaped electrodes formed on the movable electrode 22 and the drive electrode 23 are arranged to be interdigitated with each other.

Both sides of one end of the movable electrode 22 are connected to the one ends of the vertical springs 24 and 24a, respectively. The vertical springs 24 and 24a are arranged in parallel to the substrate 21 and connected to be perpendicular to the longitudinal direction of the movable electrode 22. Further, the vertical springs 24 and 24a are preferably arranged to be symmetrical around a rotation center 29 formed on the movable electrode 22.

Further, the other ends of the vertical springs 24 and 24a are connected to the vertical spring anchors 25 and 25a, respectively, to support the vertical springs 24 and 24a. The vertical spring anchors 25 and 25a are fixed on the substrate 21 by silicon oxide films 28b.

The horizontal spring 26 is formed so that a main part thereof is arranged in the longitudinal direction of the movable electrode 22 to be parallel to the movable electrode 22. Further, one end of the horizontal spring 26 is bent perpendicularly and connected to one side of the movable electrode 22, and the other end is bent perpendicularly and connected to the horizontal spring anchor 27. The horizontal spring anchor 27 functions to support the horizontal spring 26 and is fixed on the substrate 21 by a silicon oxide film 28c.

Figure 3A:
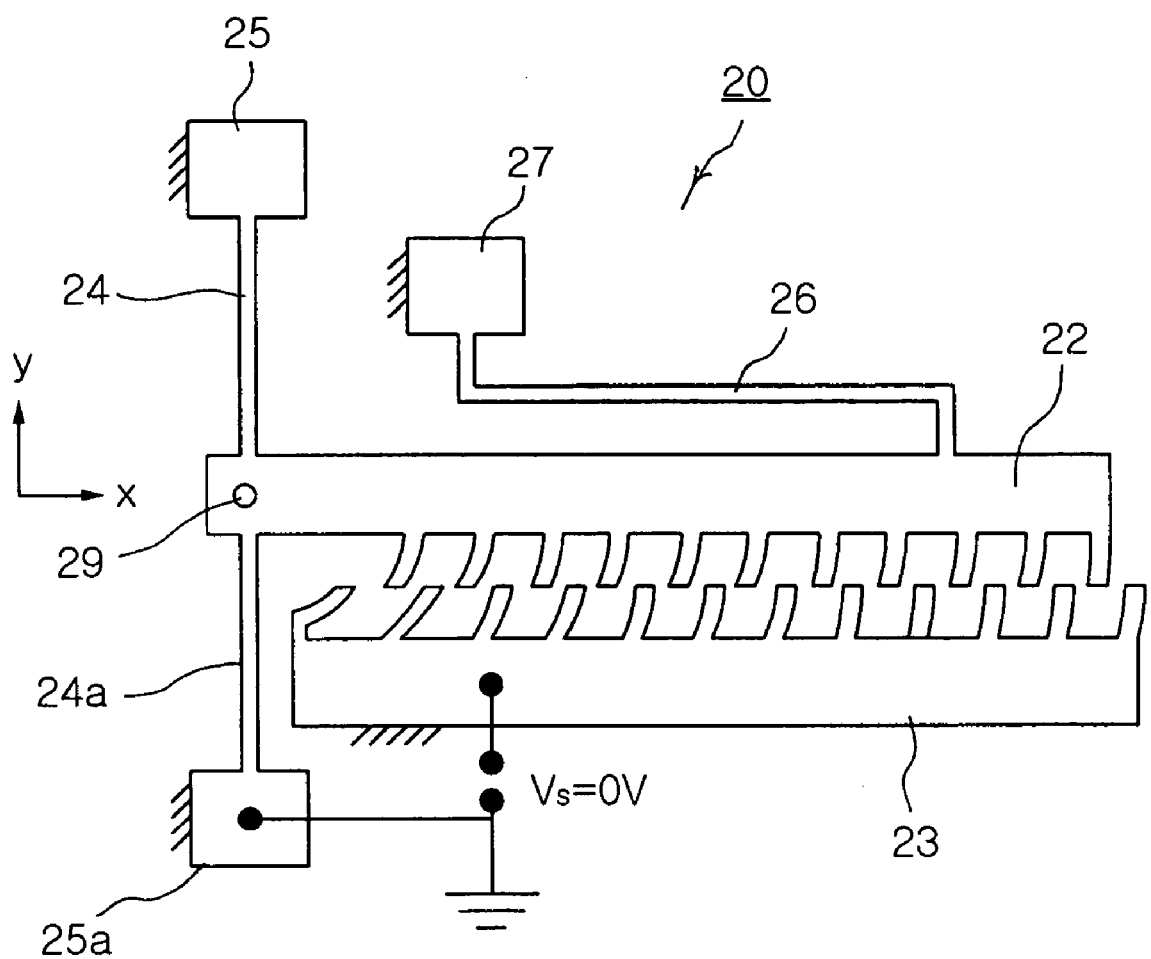
FIGS. 3a and 3b are views showing operations of the rotary-type comb-drive actuator according to the first embodiment of the present invention.
Figure 3B:
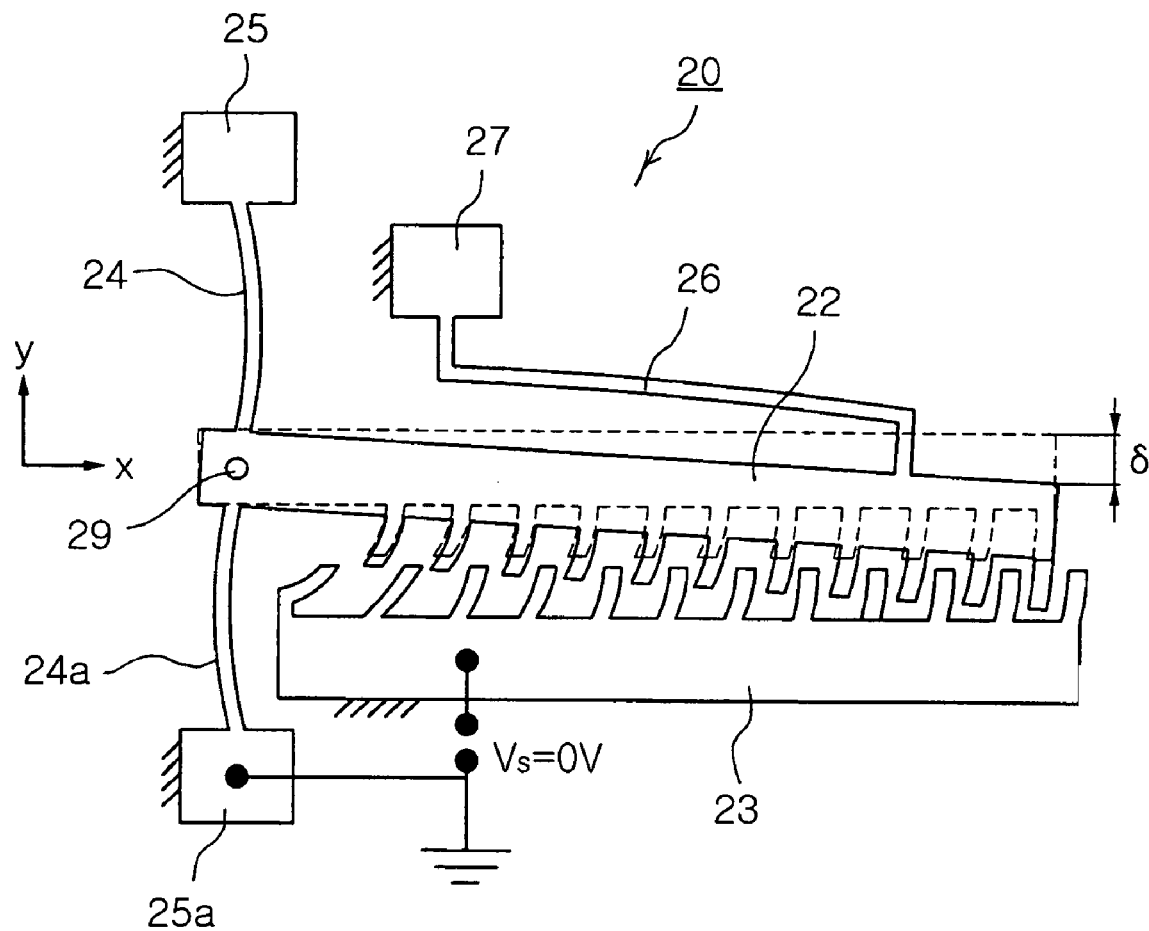

FIGS. 3a and 3b are views showing operations of the rotary-type comb-drive actuator according to the first embodiment of the present invention.

FIG. 3a illustrates a case where a rotational displacement does not occur in the rotary-type comb-drive actuator 20 according to the first embodiment of the present invention. FIG. 3b illustrates a case where a rotational displacement δ occurs in the rotary-type comb-drive actuator 20.

As shown in FIGS. 3a and 3b, the rotary-type comb-drive actuator 20 of the present invention is operated so that the movable electrode 22 is driven while rotating around the rotation center 29 when a voltage ($V_s=V_0$) is applied to the drive electrode 23. As shown in FIG. 3a, the vertical springs 24 and 24a, which are beam springs provided to be perpendicular to the longitudinal direction of the movable electrode 22, have low stiffness according to the geometric structures thereof when the movable electrode 22 performs translational motion in a horizontal (x axis) direction or rotates around the rotation center 29. In contrast, the springs 24 and 24a have very high stiffness when the movable electrode 22 performs translational motion in a vertical (y axis) direction, thus interfering with translational motion.

Further, the horizontal spring 26, which is a beam spring provided in parallel to the longitudinal direction of the movable electrode 22, has low stiffness when the movable electrode 22 rotates or performs translational motion in the vertical (y axis) direction. In contrast, the horizontal spring 26 has very high stiffness when the movable electrode 22 performs translational motion in the horizontal (x axis) direction, thus interfering with translational motion.

As described above, since the actuator 20 of the present invention has together the vertical springs 24 and 24a and the horizontal spring 26, the movable electrode 22 is caused to have low stiffness only in a mode in which the movable electrode 22 rotates around the rotation center 29, thereby restricting any translational motion performed on the plane.

As shown in FIG. 3b, the structure, comprised of the movable electrode 22, the vertical springs 24 and 24a, the horizontal spring 26, the vertical spring anchors 25 and 25a, and the horizontal spring anchor 27 is grounded. When a voltage of $V_0$ is applied to the drive electrode 23, an electrostatic force is applied to an interval between the drive electrode 23 and the movable electrode 22, so that the movable electrode 22 is rotated around the rotation center 29. With the rotation of the movable electrode 22, the movable electrode 22 causes a displacement by a certain distance δ from an original position. The distance δ by which the movable electrode 22 moves can be controlled by changing the horizontal (x axis) length of the movable electrode 22, or controlled by arbitrarily adjusting the voltage applied to the drive electrode 23.

The comb-shaped electrodes formed on the movable electrode 22 and the drive electrode 23 are preferably formed to have fingers extended along concentric arcs around the rotation center 29 so that the electrodes do not interfere with each other during the rotation of the movable electrode 22.

Figure 4:
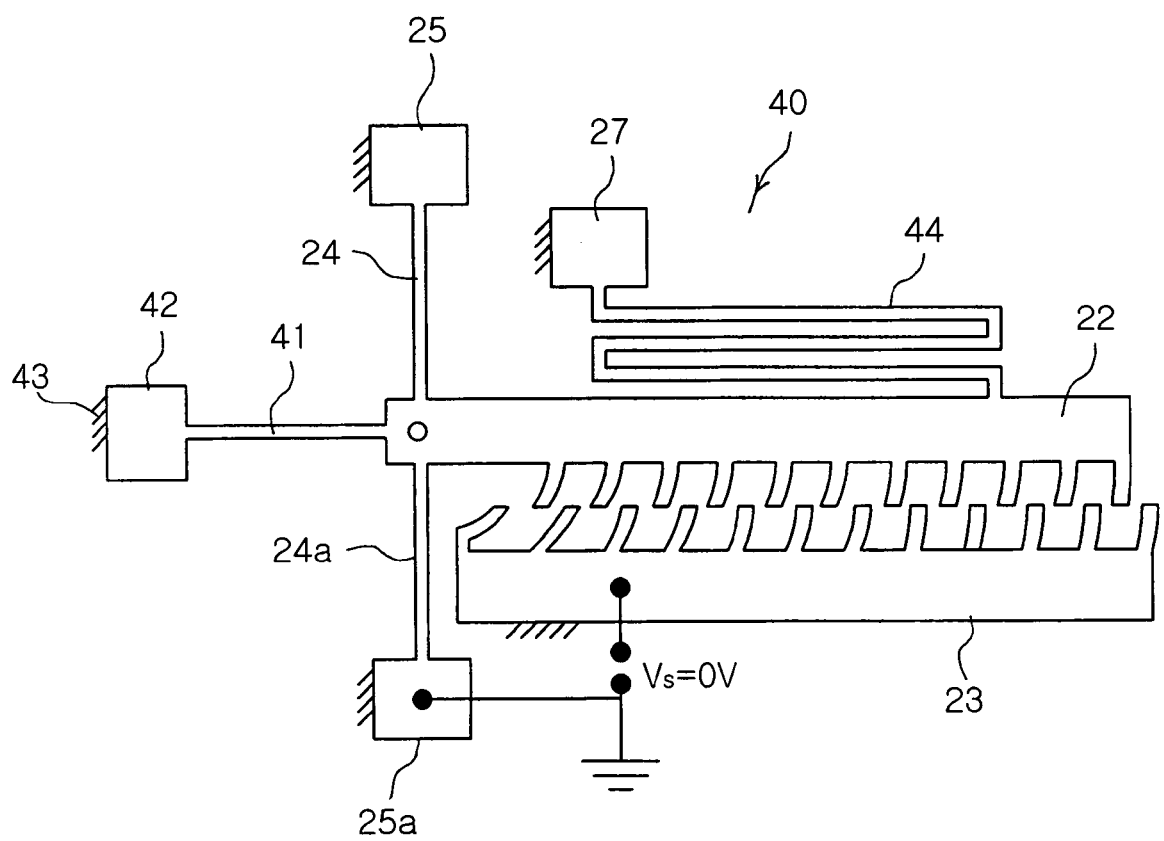
FIG. 4 is a plan view of a rotary-type comb-drive actuator according to a second embodiment of the present invention.

FIG. 4 is a plan view of a rotary-type comb-drive actuator according to a second embodiment of the present invention.

Referring to FIG. 4, a rotary-type comb-drive actuator 40 according to the second embodiment of the present invention further includes an auxiliary horizontal spring 41, which is a beam spring arranged in a horizontal (x axis) direction, and an auxiliary horizontal spring anchor 42. The auxiliary horizontal spring anchor 42 is fixed on the substrate 21 by a silicon oxide film 43.

The rotary-type comb-drive actuator 40 includes the auxiliary horizontal spring 41 extending along the longitudinal direction of the movable electrode 22 from an end of the movable electrode 22 adjacent to the rotation center 29, and the auxiliary horizontal spring anchor 42 to support the auxiliary horizontal spring 41, thus restricting the movement of the movable electrode 22 in the horizontal (x axis) direction through much higher stiffness.

Further, in the rotary-type comb-drive actuator 40 according to the second embodiment of the present invention, a horizontal spring can be formed in a meander line structure in which the horizontal spring 44 is bent several times. Such a meander line-shaped horizontal spring 44 can be applied to all actuators shown in other embodiments of the present invention as well as the second embodiment.

Figure 5:
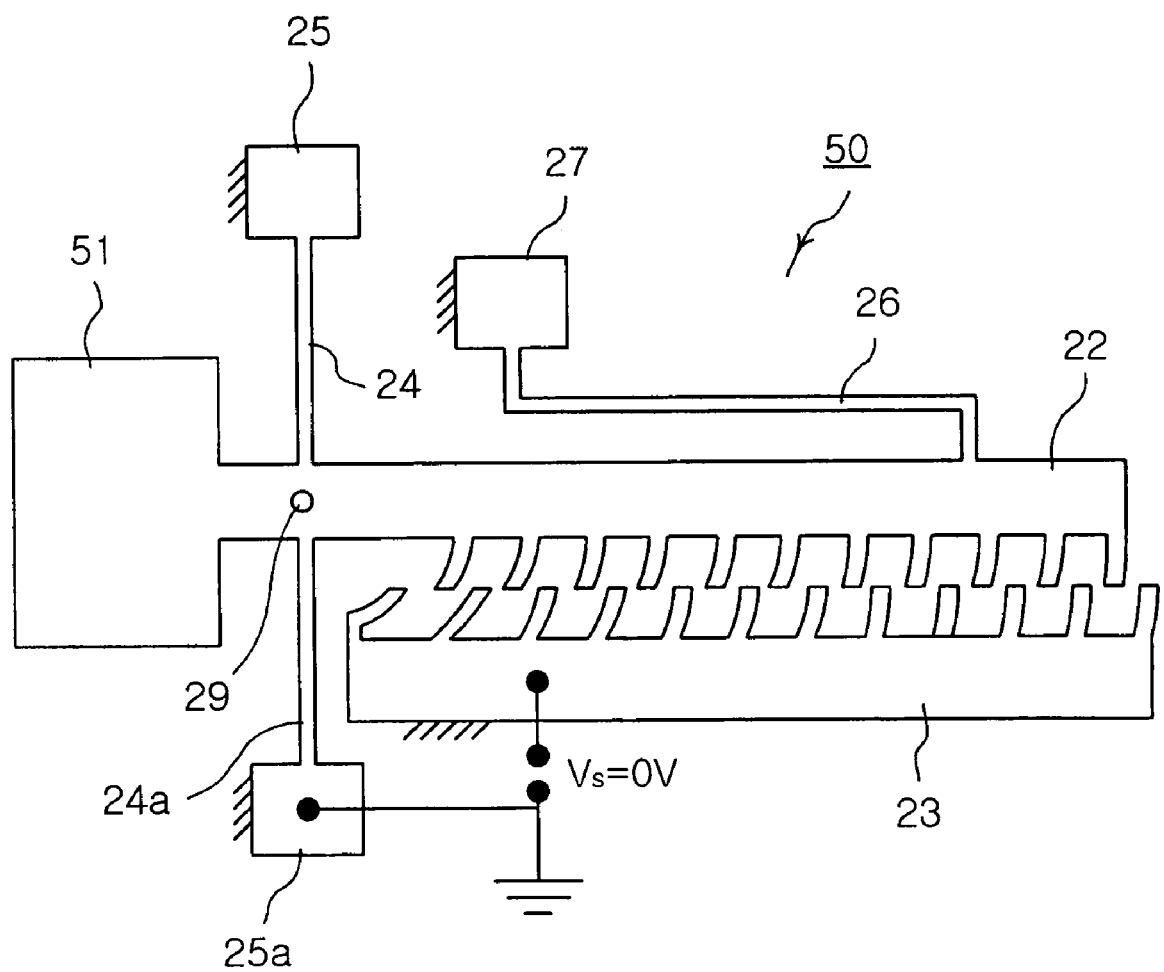
FIG. 5 is a plan view of a rotary-type comb-drive actuator according to a third embodiment of the present invention.

FIG. 5 is a plan view of a rotary-type comb-drive actuator according to a third embodiment of the present invention.

Referring to FIG. 5, a rotary-type comb-drive actuator 50 according to the third embodiment of the present invention further includes a counter mass 51 on a side opposite to the movable electrode 22 around the rotation center 29. The counter mass 51 has a certain weight to allow the rotation center 29 to be the center of the gravity without being fixed on the substrate 21.

When the counter mass 51 is formed in the rotary-type comb-drive actuator 50 as in the case of the third embodiment of the present invention, the excitation force of a vibration noise acts on the center of the gravity, that is, the rotation center 29, even when the vibration noise is externally caused in any direction of translational motion, thus eliminating moment generated in the actuator 50 by such excitation. The rotary-type comb-drive actuator 50 having the counter mass 51 can minimize the generation of the rotation attributable to external excitation. Further, as described above, the actuator 50 is characterized in that, since it has very high stiffness at the time of translational motion due to the action of the vertical springs 24 and 24a and the horizontal spring 26, the actuator 50 is immune to external vibrations.

The rotary-type comb-drive actuators 20, 40 and 50 according to the embodiments of the present invention are characterized in that a large displacement can be generated even during low voltage driving, and manufactured through a MEMS manufacturing process using a Silicon On Insulator (SOI) wafer.

Figure 6A:
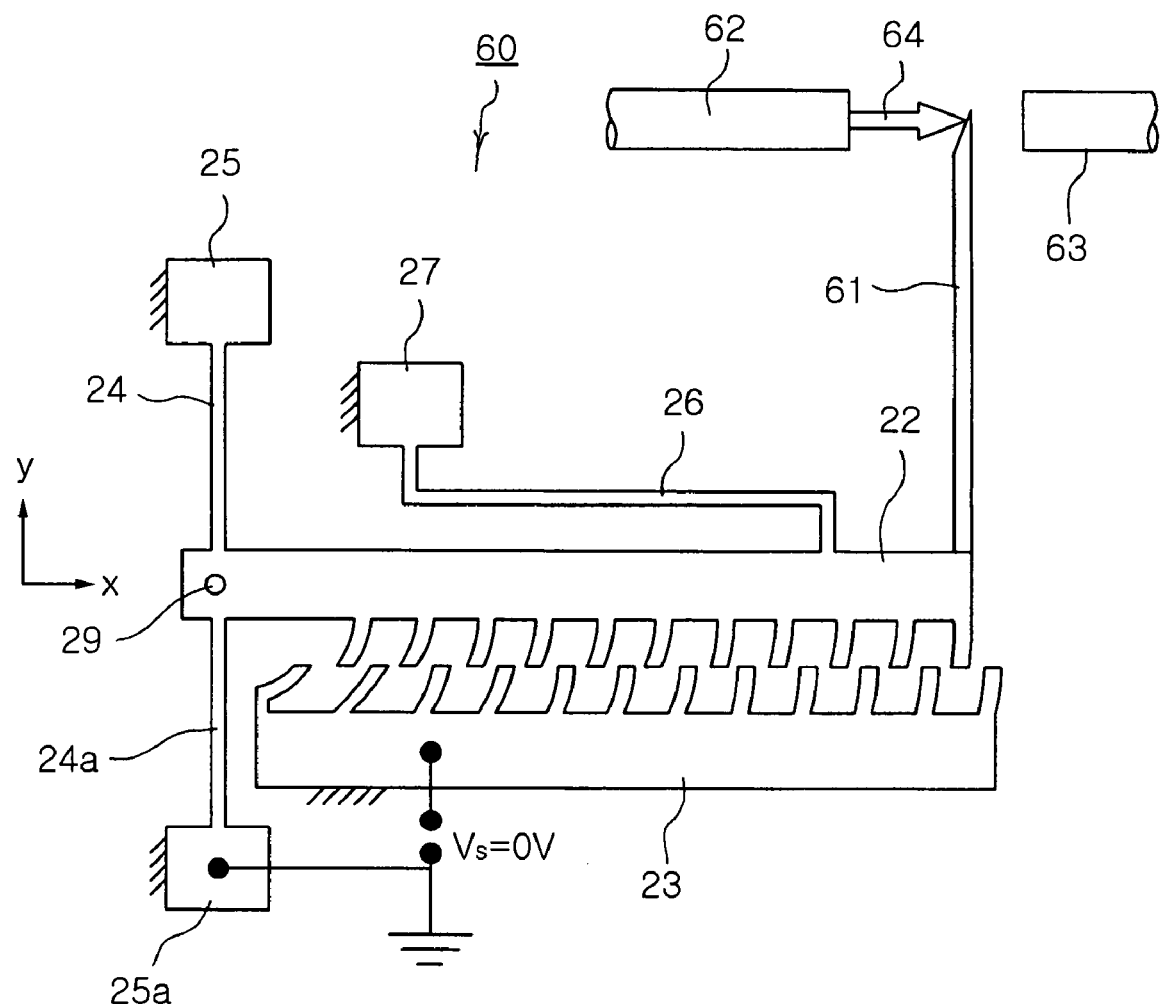
FIGS. 6a and 6b are plan views of a variable optical attenuator using the rotary-type comb-drive actuator according to an embodiment of the present invention.
Figure 6B:
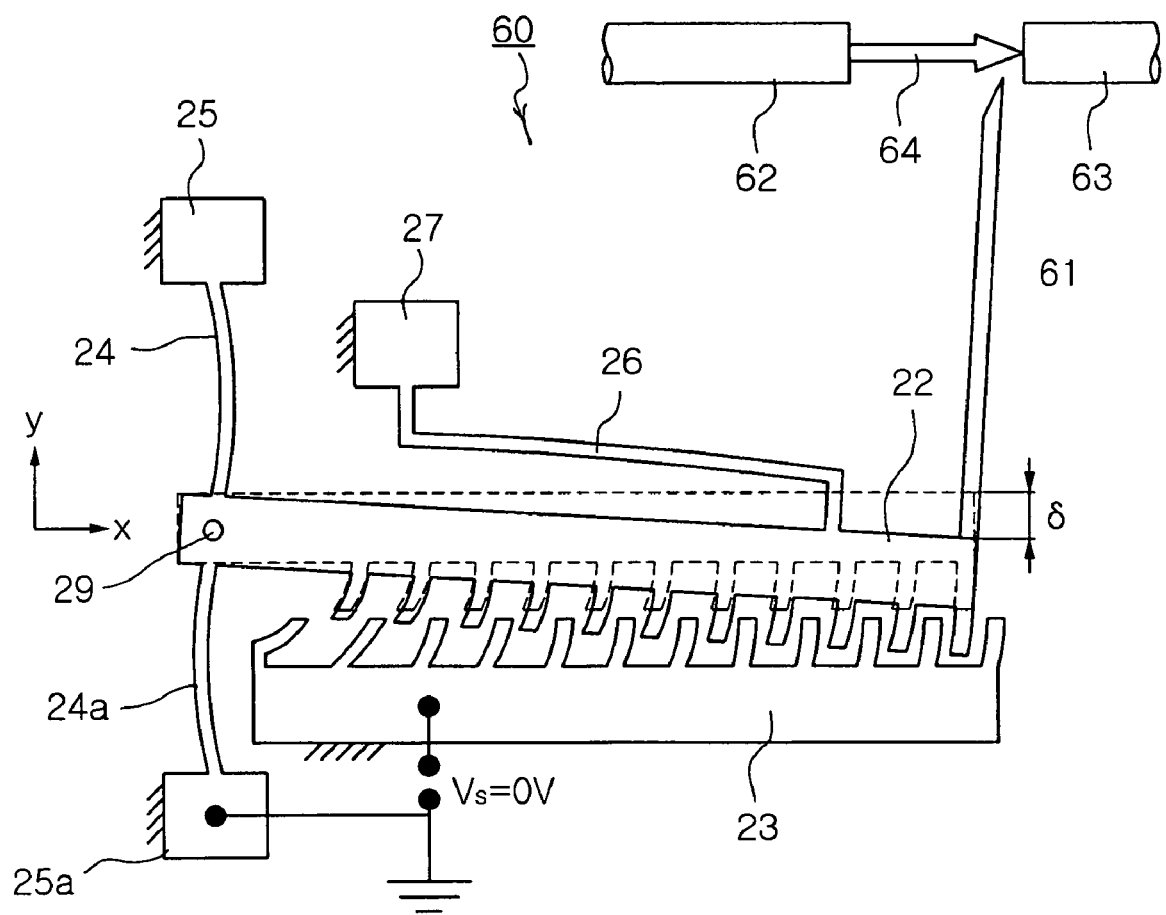

FIGS. 6a and 6b are plan views of a variable optical attenuator using the rotary-type comb-drive actuator according to an embodiment of the present invention. FIG. 6a illustrates a case where a rotational displacement does not occur in the comb-drive actuator.

A variable optical attenuator 60 according to the embodiment of the present invention functions to control the power of an optical signal in an optical network. The optical attenuator 60 employs the above-described rotary-type comb-drive actuator 20, 40 or 50, and further includes a micro shutter 61, and a transmission optical fiber 62 and a reception optical fiber 63 made of optical fibers. The micro shutter 61 and the transmission/reception optical fibers 62 and 63 are arranged on the silicon substrate 21. In this case, the rotary-type comb-drive actuator 20 according to the first embodiment of the present invention is shown in FIGS. 6a and 6b, but the rotary-type comb-drive actuator 40 or 50 according to the second or third embodiment of the present invention can be applied to the variable optical attenuator. The constructions and operations of the rotary-type comb-drive actuators 20, 40 and 50 according to the embodiments of the present invention are described above, so that the repetitive descriptions thereof are omitted.

Further, the transmission and reception optical fibers 62 and 63 are arranged to be collinear so as to allow light incident from the transmission optical fiber 62 to be output through the reception optical fiber 63.

As shown in FIG. 6a, the micro shutter 61 has one end connected to one end of the movable electrode 22 of the rotary-type comb-drive actuator remote from the rotation center 29 on the movable electrode 22, and the other end disposed between the transmission and reception optical fibers 62 and 63 to function to intercept light 64. That is, when a voltage is not applied, the micro shutter 61 blocks an optical path between the transmission and reception optical fibers 62 and 63 and intercepts light, thus maximally attenuating the quantity of light. At this time, the end of the micro shutter 61 can be formed in a structure capable of intercepting or reflecting propagating light.

FIG. 6b illustrates a case where a rotational displacement occurs in the comb-drive actuator. As shown in FIG. 6b, when a voltage is applied to the drive electrode 23, the movable electrode 22 of the actuator rotates, and the micro shutter 61 is removed from the optical path on which the shutter 61 blocks the light 64, thus maximizing the quantity of light incident onto the reception optical fiber 63, that is, minimizing the attenuation of the quantity of light. Further, the variable optical attenuator can control optical communication signals by arbitrarily controlling a voltage applied to the drive electrode 23.

As described above, the present invention provides a rotary-type comb-drive actuator, which is advantageous in that it can obtain a required driving distance using a low drive voltage without requiring an additional circuit. That is, if the linear displacement of an end point of the actuator does not achieve a required driving distance (for example, 25 μm) in the case where the rotary-type comb-drive actuator is designed to operate in a resonance area immune to external vibrations and then a voltage equal to or less than 5V is applied to occur a rotational displacement, a desired displacement can be obtained by the increase of the length of a movable electrode of the actuator. Therefore, the present invention is advantageous in that it can obtain a required linear displacement using only a low voltage while minimizing the influence of external vibrations on the actuator. The results obtained by experiments show that the resonant frequency of a rotary-type comb-drive actuator, which is implemented through an actual design and manufacturing process and driven at a voltage of 5V and a driving distance of 25 μm, is 1.4 KHz. Therefore, it can be seen that the actuator exhibits response characteristics immune to external vibrations.

Further, the present invention is advantageous in that the rotary-type comb-drive actuator can obtain a required driving distance while being easily manufactured as a small-sized device.

Moreover, the present invention is advantageous in that a small-sized optical attenuator can be easily implemented using the rotary-type comb-drive actuator, and it control output light by controlling the quantity of incident light to a certain level using a low voltage.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rotary-type comb-drive actuator, comprising:
   a substrate;
   a movable electrode arranged on a plane of the substrate to be movable in parallel to the substrate plane, and formed to have a predetermined length so as to have a comb-shaped electrode comprised of a plurality of fingers;
   a drive electrode formed to have a length corresponding to that of the movable electrode so as to apply an electrostatic force to the movable electrode, and formed to have a comb-shaped electrode that is comprised of a plurality of fingers and arranged to be interdigitated with the comb-shaped electrode of the movable electrode, the drive electrode being fixed on the substrate;
   one or more vertical springs arranged in parallel to the substrate, and connected to be perpendicular to the movable electrode on both sides of a first end of the movable electrode;
   one or more vertical spring anchors connected to the vertical springs to support the vertical springs, and fixed on the substrate;

a horizontal spring having a main part connected in parallel to a longitudinal direction of the movable electrode, the horizontal spring being connected to a side of the movable electrode; and a horizontal spring anchor connected to the horizontal spring to support the horizontal spring, and fixed on the substrate.

2. The rotary-type comb-drive actuator according to claim 1, wherein the comb-shaped electrodes formed on the movable and drive electrodes are designed to have the fingers concentrically extended around a rotation center on the movable electrode so that the electrodes do not interfere with each other during rotation of the movable electrode.

3. The rotary-type comb-drive actuator according to claim 1, wherein the vertical springs are arranged to be symmetrical around a rotation center on the movable electrode.

4. The rotary-type comb-drive actuator according to claim 1, wherein the horizontal spring has a first end bent perpendicularly and connected to a side of the movable electrode, and a second end bent perpendicularly and connected to the horizontal spring anchor.

5. The rotary-type comb-drive actuator according to claim 1, wherein the substrate is made of silicon.

6. The rotary-type comb-drive actuator according to claim 1, further comprising:

an auxiliary horizontal spring extending along a longitudinal direction of the movable electrode from an end of the movable electrode adjacent to a rotation center on the movable electrode; and an auxiliary horizontal spring anchor connected to the auxiliary horizontal spring to support the auxiliary horizontal spring, and fixed on the substrate.

7. The rotary-type comb-drive actuator according to claim 1, wherein the horizontal spring is formed in a meander line structure in which the horizontal spring is bent several times.

8. The rotary-type comb-drive actuator according to claim 1, further comprising a counter mass with a predetermined weight connected to an end of the movable electrode adjacent to a rotation center on the movable electrode so that an excitation force of a vibration noise acts on the rotation center when the vibration noise occurs in the actuator in a direction of translational motion.

9. A variable optical attenuator, comprising:

the rotary-type comb-drive actuator according to claim 1;

a transmission optical fiber arranged on the substrate and adapted to receive incident light;

a reception optical fiber arranged to be collinear with the transmission optical fiber and adapted to output light; and a micro shutter having a first end connected to an end of the movable eletrode remote from a rotation center on the movable eletrode, and a second end formed in a structure to intercept the light, thus controlling light to the reception optical fiber.

* * * * *